United States Patent [19]

Kamman

[11] 4,114,246
[45] Sep. 19, 1978

[54] METHOD OF AND MEANS FOR MAKING TUNED VISCOUS TORSIONAL VIBRATION DAMPERS

[75] Inventor: Gordon W. Kamman, Elma, N.Y.

[73] Assignee: Houdaille Industries, Inc., Buffalo, N.Y.

[21] Appl. No.: 811,256

[22] Filed: Jun. 29, 1977

[51] Int. Cl.² ............................................ F16F 15/16
[52] U.S. Cl. ......................................... 29/451; 29/458; 29/705; 29/281.1; 74/574; 188/1 B; 156/64; 156/145
[58] Field of Search ................ 29/460, 522, 458, 450, 29/451; 74/574; 188/1 B; 156/64, 145, 309

[56] References Cited

U.S. PATENT DOCUMENTS

| 2,636,399 | 4/1953 | O'Connor | 29/522 X |
| 3,410,369 | 11/1968 | Ishizuka | 74/574 X |
| 3,678,782 | 7/1972 | Aoki | 74/574 |
| 3,823,619 | 7/1974 | Shotwell | 74/574 |
| 4,046,230 | 9/1977 | Troyer | 74/574 |

*Primary Examiner*—Milton S. Mehr
*Attorney, Agent, or Firm*—Hill, Gross, Simpson, Van Santen, Steadman, Chiara & Simpson

[57] ABSTRACT

A method of making a tuned viscous torsional vibration damper assembly of the type having supporting disk means with a radially outwardly extending circular body and a radially inner hub portion adapted to be secured to a rotary member such as a crankshaft subject to vibrations to be damped by the damper, the body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, comprising assembling the rings in the grooves, placing concentricity maintaining shoulder means across radially inner open sides of the grooves whereby to assure concentricity of the rings within the grooves, effecting bonding of the rings to the opposing surface areas of the inertia mass and of the body, and after the bonding removing the concentricity maintaining shoulder means. Apparatus for practicing the method is also disclosed.

15 Claims, 6 Drawing Figures

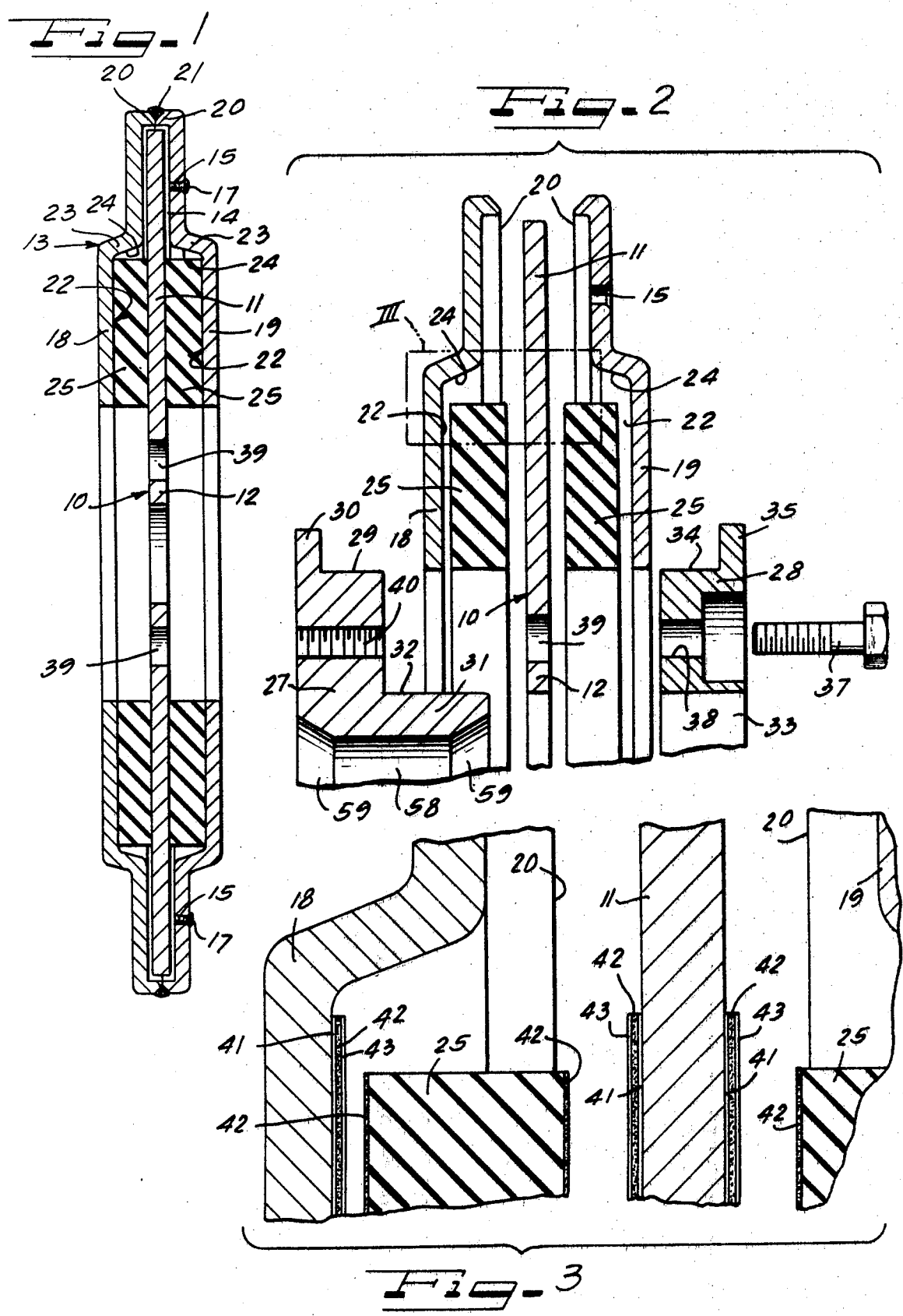

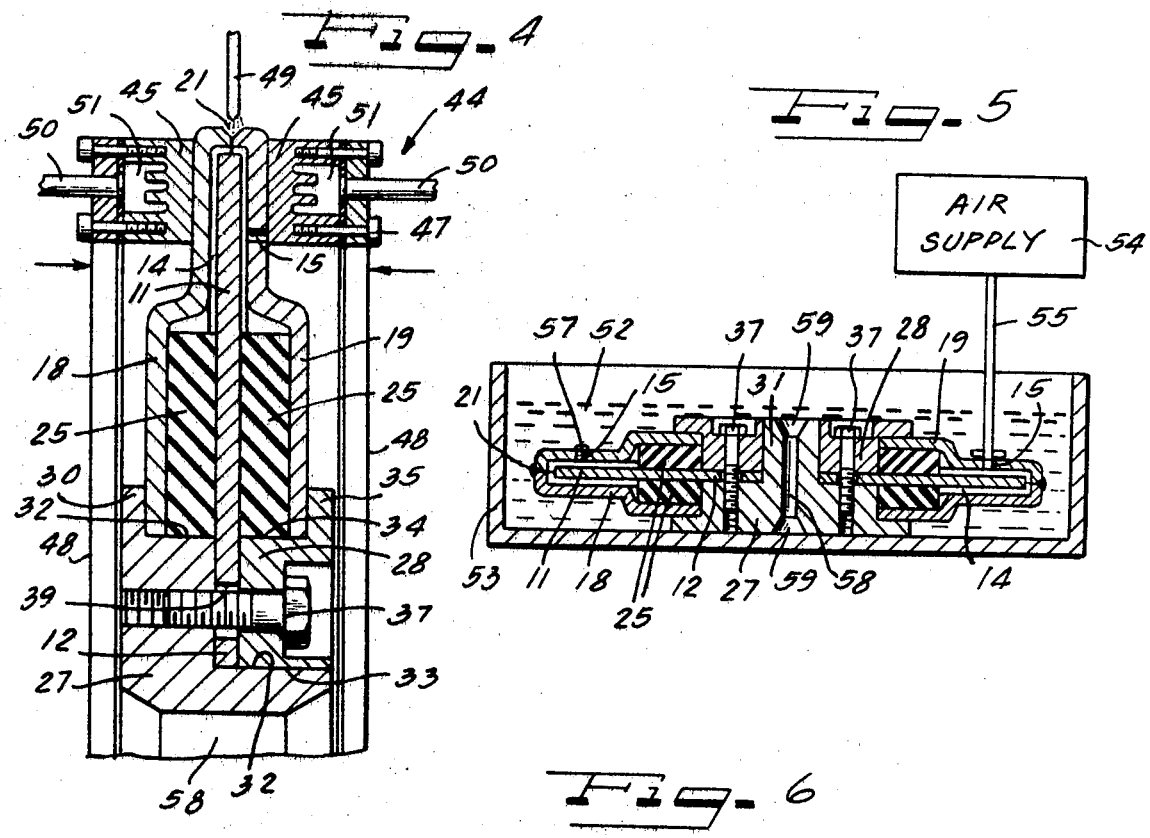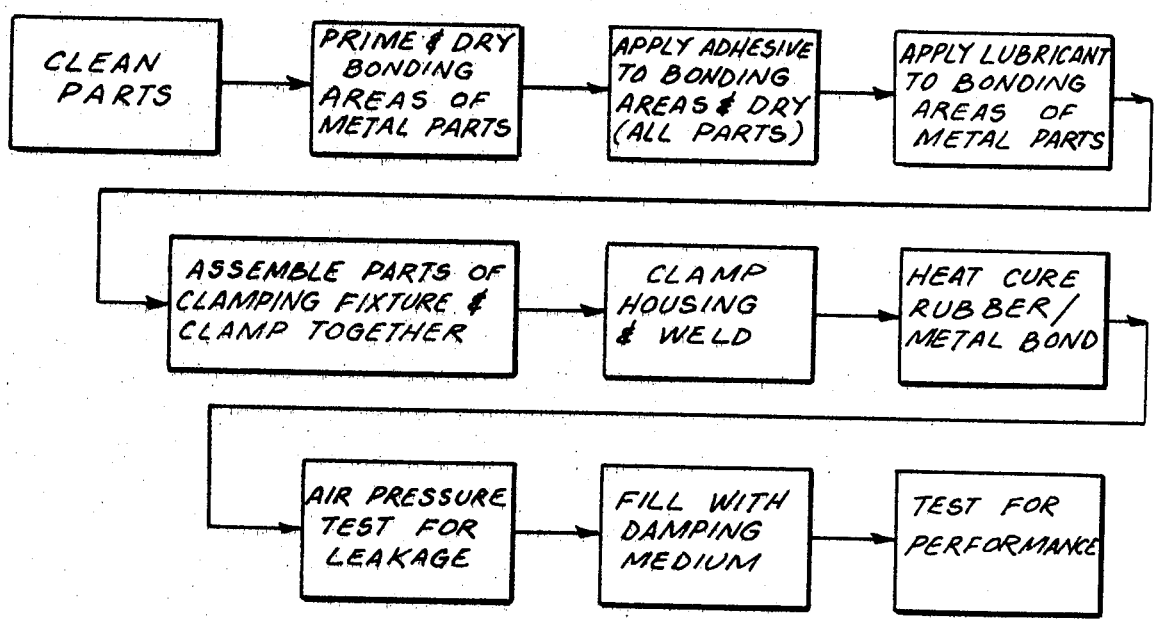

METHOD OF AND MEANS FOR MAKING TUNED VISCOUS TORSIONAL VIBRATION DAMPERS

This invention relates to improvements in method of and apparatus for making tuned viscous torsional vibration dampers, and is more particularly concerned with dampers of this type in which an annular inertia mass is mounted on a radially extending combination damper disk and flange plate in which a body portion of the plate is in shear film working relation within the inertia mass and a radially inner portion of the disk provides a mounting hub for attachment to a rotary member such as a crankshaft subject to vibrations to be damped by the damper.

As is well known in the art, numerous advantages have been experienced with viscous torsional vibration dampers, that is dampers utilizing the phenomenon of resistance to shearing of a thin layer of viscous damping medium such as silicone fluid between relatively moving opposed parallel working surfaces in part corotative with a rotary member such as a crankshaft subject to torsional vibrations and in part carried by an inertia mass relatively torsionally movable with respect to the rotary member to be damped. One desirable form of such dampers comprises a disk-like flange structure having a hub portion to be attached to the rotary member to be damped and a radially extending body portion carrying a ring shaped inertia member having a working chamber enclosing an annular body portion of the disk flange structure, with surfaces of the disk body and the inertia member in shear film spaced relation having regard to the viscosity of the viscous damping medium which is sealed within the chamber by means of elastic tuning spring, spacing and sealing rings at the radially inner side of the working chamber.

According to several prior arrangements, of which U.S. Pat. No. 3,303,719 is representative, the sealing and spacing rings are located at juncture of the inertia member carrying portion of the mounting disk and axially extending flanges on the disk between the carrying portion and the hub portion. Such an arrangement affords little, if any, tuning advantage from the elastic rings.

As is well disclosed in U.S. Pat. No. 2,636,399 for example, an objectionable torsional vibration may occur at some speed within the normal operating speed range for the mass elastic system being damped; and to overcome this it is desirable to connect the damper inertia mass to the hub by means of rubber or rubber-like tuning spring means in such a fashion that the frequency of the spring and inertia mass is a certain percentage of the natural frequency of the entire mass elastic system, thereby providing a counteracting force which gives the damper hub and inertia mass significantly more relative movement than they would have without the tuning spring. Since the amount of friction work that can be done by the viscous damping elements and by the elastic tuning spring means is a function of the relative amplitude, dampers using the tuning spring means are capable of transforming more torsional vibratory energy into heat energy and are thus capable of reducing the torsional vibration amplitudes of the system to lower levels. This desirable effect is contingent upon being able to obtain the proper dimensions and location of the elastic spring means. In the forms of the damper shown in U.S. Pat. No. 2,636,399, the elastic tuning rings are enclosed within the working chamber in which the inertia mass is housed.

A damper arrangement of the inertia ring carried on a mounting disk type which can attain at least some tuning advantage from the greater resistance to shear of elastic bodies as compared to viscous damping medium alone is disclosed in U.S. Pat. No. 3,410,369. However, a serious deficiency in that disclosure is the difficulty in attaining concentricity of the elastic rings. In the examples disclosed in U.S. Pat. No. 3,410,369, the radially inner sides of the elastic rings are uncontrolled so that during assembly of the dampers the rings are liable to eccentric misplacement.

Accordingly, it is an important object of the present invention to overcome the disadvantages, deficiencies, inefficiencies, shortcomings and problems inherent in making prior dampers of the kind under consideration, and to provide a new and improved method of and means for making tuned viscous torsional vibration dampers.

Another object of the invention is to provide a new and improved method of and means for making torsional vibration dampers of the type having an annular inertia mass supported on a radial mounting disk and provided with elastic tuning spring, spacing and sealing rings coupling opposing surface areas of the inertia mass in grooves having surface areas opposing body areas of the disk.

A further object of the invention is to provide a new and improved method of and means for assuring substantially accurate, efficient, balanced tuning by means of elastic, i.e., rubber including elastomeric, tuning spring rings in torsional viscous dampers.

According to features of the invention there is provided a method of making a tuned viscous torsional vibration damper assembly of the type having supporting disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, comprising assembling said rings in said grooves, placing concentricity maintaining shoulder means across radially inner open sides of said grooves whereby to assure concentricity of said rings within the grooves, effecting bonding of the rings to said opposing surface areas of said inertia mass and of said body, and after said bonding removing said concentricity maintaining shoulder means.

According to other features of the invention there is provided apparatus for making a tuned viscous torsional vibration damper of the kind just described, and especially adapted for practicing the described method, and which apparatus comprises concentricity maintaining shoulder means constructed and arranged to extend across radially inner open sides of the elastic ring grooves whereby to assure concentricity of the rings assembled within the grooves and until bonding of the rings has been effected to the opposing surface areas of the inertia mass and of the body, and means for releasably attaching the shoulder means to the damper assembly so that after said bonding has been effected, the shoulder means can be removed from the damper assembly.

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure, and in which:

FIG. 1 is a vertical sectional detail view through a damper embodying features of the invention.

FIG. 2 is an enlarged fragmentary exploded assembly view illustrating the parts of the damper in their relative orientation for effecting assembly of the damper, and also illustrating orientation of concentricity maintaining shoulder means to be placed in elastic ring concentricity assuring relation to the damper assembly.

FIG. 3 is a greatly enlarged fragmental sectional detail view taken substantially within the balloon III.

FIG. 4 is a fragmentary vertical sectional detail view demonstrating the step of welding the inertia mass housing parts together in the damper assembly.

FIG. 5 is a schematic view illustrating the testing of the damper for leakage; and FIG. 6 is a flow diagram of steps in making the damper.

On reference to FIG. 1, a finished tuned viscous torsional vibration damper made according to the present invention comprises a supporting disk 10 having a radially outwardly extending circular body and a radially inner hub portion 12 adapted to be secured to a rotary member such as a crankshaft (not shown) subject to vibrations to be damped by the damper. An annular inertia mass 13 has a radially inwardly opening annular working chamber 14 within which the disk body 11 is received concentrically. A viscous damping medium such as a suitable viscosity silicone fluid is in the chamber 14 between shear film spaced working surfaces of the body 11 and the inertia mass 13. Filling of the annular working chamber 14 with the viscous damping fluid is adapted to be effected through one of a pair of filler openings 15 desirably opening into the chamber in diametrically spaced relation, one of the openings serving to receive the damping fluid therethrough and the other serving as an air escape opening. After filling of the damper, the ports 15 are, as is customary, hermetically sealed as by means of welding 17.

Although the inertia mass housing 13 may be constructed from machined parts, in a preferred construction the inertia mass comprises a pair of substantially identical mirror image annular heavy gauge metal stampings 18 and 19, each of which has at its radially outer perimeter a closure and spacing flange 20 abutting the edge of the companion flange 20 and fixedly secured in that relationship by any suitable means, such as welding 21 which also hermetically seals the joint at the abutting edges of the flanges. By proper dimensioning of the flanges 20 proper shear film spacing between the supporting disk and the inertia mass housing parts is attained, having regard to the viscosity of the damping medium filled into the chamber 14.

In addition, each of the inertia mass housing members 18 and 19 is shaped to provide a concentric annular groove 22 complementary to the groove 22 of the other of the members such that opposite sides of the body 13 have the grooves facing axially toward the disk body 11 contiguous to the radially inward opening from the working chamber 14. In the preferred construction, the grooves 22 are formed by offsetting the groove defining radially inner annular portions of the members 18 and 19 relative to the radially outer annular portions of the members which define the working chamber 14. Respective oblique shoulders 23 connect the groove defining and chamber defining portions of the members 18 and 19 and define for the radially outer sides of the grooves 22 oblique radially outwardly sloping surfaces 24. At their radially inner sides, the grooves 22 open freely radially inwardly. Within the grooves 22 are assembled elastic tuning spring, spacing and sealing rings coupling the opposing surface areas of the inertia mass in the grooves 22 and opposing surface areas on the supporting disk body 11. Each of the rings 25 is desirably about four times as wide considered in the radial extent as it is thick considered in the axially extent. In addition, each of the rings 25 has its inner diameter substantially aligned coaxially with the inner diameter of the inertia member 18 or 19 with which associated whereby the inner diameter of the inertia mass 13 and of the rings 25 remains substantially free from any dirt catching groove. In addition, although the axial faces of the rings 25 are bonded to the opposing axially facing surface areas of the inertia mass 13 and the body 11, the radially inner and radially outer diameter surfaces of the rings 25 are free from contact with any other part of the damper assembly. Hence, the entire torsional damping coupling between the inertia mass 13 and the body 11 is through the axially facing working surfaces in the working chamber 14 and the elastic rings 25 through their axial, bonded faces, and the radially inner and outer diameter surfaces of the rings 25 are entirely free from imposition of any stress during torsional damping action of the elastic rings. At the radially outer diameters of the rings 25, the obliquely angularly extending surfaces of the rings 25 substantially assure freedom from contact between the rings and the surfaces 24. Additionally, the space between the radially outer diameters of the rings 25 and the oblique surfaces 24 provides desirable reservoir volume for the radially inner side of the working chamber 14. Through this arrangement, the damper operates not only as a viscous damper, but also as a tuned rubber damper.

Relative parallel movement between the working surfaces of the body 11 within the working chamber 14 and the opposed parallel working surfaces of the chamber-defining portions of the inertia members 18 and 19 is resisted by the viscous coupling provided by the viscous damping medium, because any relative parallel vibratory torsional movement causes laminar shearing of the viscous medium whereby energy is dissipated and vibrations are damped. By having the elastic rings 25 bonded to the opposing surfaces of the body 11 and the inertia members 18 and 19, a desirable elastic tuning is attained by means of the elastic rings. It will be understood that by the term "elastic" is meant a rubber or rubber-like elastomeric material possessing the proper elasticity for the tuning function of the rings 25. At least on those surfaces exposed to the viscous damping medium fluid in the working chamber 14, the rings 25 must be inert to such fluid either by treatment of those surfaces or by selection of the material from which the rings are made.

Optimum cooperative tuning function of both of the elastic rings 25 is assured by having them as nearly as practicable equal in all respect, including size, concentricity, composition, bonding to the other components of the damper assembly, and degree of compression were that is effected as is generally desirable. Efficient control of these several parameters is best attained by premolding the rings 25 according to desired specifications according to which each of the rings will be substantially equal to the other. In a preferred arrangement, each of the rings 25 as prefabricated has an inner diameter which is substantially the same as the inner diameter of the damper inertia weight housing members 18 and 19, as best visualized in FIG. 2. In addition, as prefabricated, each of the rings 25 is of a thickness which is greater than the ultimate assembled thickness of the rings in the completed damper assembly so that when the inertia members 18 and 19 are brought together in the damper assembly, the elastic rings 25 will be placed under a degree of permanent compression corelated to the durometer and size of the rings in the damper assembly to attain the desired tuning results of the elastic rings in operation of the damper. To permit flow of the elastic rings 25 under compression, the prefabricated radially outer diameter of the rings is smaller than the compressed diameter sufficient to permit radially outward displacement expansion of the material of the rings under compression to an extent preferably limited to substantially avoid contact of the radially outer diameters of the rings 25 with the inertia member housing surfaces 24.

In making the damper, the parts are assembled together substantially as indicated in FIG. 2, wherein the rings 25 are assembled in the grooves 22 and with the disk body 11 between the rings. Concentricity maintaining shoulder means are then placed across the radially inner open sides of the grooves and in engagement with the radially inner diameters of the rings whereby to assure concentricity of the rings within the grooves. Preferred means for this purpose comprise an annular two-member clamp and shoulder device in which an annular shoulder and clamp member 27 is constructed and arranged to inerfit with the radially inner side of the damper assembly at one axial side of the hub portion 12 of the disk 10. A complementary annular shoulder and clamp member 28 is constructed and arranged to cooperate telescopically with the member 27 and to interfit with the radially inner side of the damper assembly at the opposite axial side of the hub portion 12. As shown, the shoulder clamp member 27 has a cylindrical radially outwardly facing pilot shoulder 29 on which the radially inner diameter of one of the inertia mass members, herein the member 18, is slidably received, together with the inner diameter of the associated elastic ring 25. A radially outwardly extending annular clamping flange 30 at the axially outer side of the annular shoulder 29 is engageable with the axially outer face of the adjacent radially inner portion of the member 18. Projecting axially inwardly on the radially inner portion of the shoulder clamp member 27 is an annular pilot gauging extension 31 having a cylindrical concentricity pilot shoulder 32 slidably engageable with the radially inner diameter surface of the hub 12 and of a length to extend into concentrically engaging slidable relation with a complementary radially inner annular cylindrical surface 33 on the shoulder clamp member 28. On its radially outer side, the member 28 has a cylindrical radially outwardly facing pilot shoulder 34 which is slidably engageable with the radially inner edge of the inertia member 19 and the radially inner diameter of the associated elastic ring 25. At the axially outer side of the shoulder 34, a radially outwardly projecting clamping flange 35 similar to the clamping flange 30 is engageable with the axially outer face of the adjacent portion of the member 19.

After the several parts of the damper have been assembled together with one another and with the shoulder clamp members 27 and 28, the shoulder clamp members are drawn clampingly together so that the clamping flanges 30 and 35 place the inertia members 18 and 19 under clamping pressure toward the associated elastic rings 25 whereby to place the elastic rings under compression between the opposed surfaces of the body 11 and the inertia members 18 and 19. Clamping action of the shoulder clamp members 27 and 28 is adapted to be effected by means comprising bolts 37 extending through bolt holes 38 in the clamp member 28 aligned with respective bolt holes 39 in the hub portion 12, and threaded into respective aligned threaded bores 40 in the clamp member 27. As many of the bolts 37 may be employed as will facilitate effecting the clamping action, depending upon the size of damper being made. In a small damper two of the bolts 37 diametrically related in the assembly, substantially as shown in FIG. 5, will serve the purpose.

Clamping approach of the clamp members 27 and 28 toward one another is limited by the length of the shoulders 29 and 34 and more particularly the length of the body of each of the clamping members axially inwardly from the clamping flanges 30 and 35. Thereby, when the axially inner ends of the members 27 and 28 bottom against the disk hub 12, the outer diameter closure and spacer flanges 20 of the inertia members 18 and 19 are brought into abutting engagement. In addition, of course, the mounting disk 10 is held concentric in the assembly by the pilot shoulder 32.

Prior to assembling the damper parts, they are desirably prepared for efficient bonding of the elastic rings 25 to the other damper parts. For this purpose, as detailed in the flow diagram of FIG. 6, the parts are cleaned to remove any grease or other contaminants that might interfere with a secure bond. Next, all of the areas of the metal parts 10, 18 and 19 of the damper assembly which are to be bonded with the elastic rings 25 are primed, and the primer allowed to dry to a layer 41, as shown in FIG. 3. Although only the inertia member 18 is shown in FIG. 3, it will be understood that a bonding layer 41 is applied to the bonding area of the member 19 as well. On the primed bonding areas 41 on the metal parts, and on the bonding areas, that is the axial faces of the elastic rings 25 adhesive 42 is applied. By way of example, and not by way of limitation, where the elastomer of the rings 25 is a synthetic rubber such as Hypalon (E. I. DuPont de Nemours & Co.) a heat curable rubber-to-metal adhesive such as Chemlok 234-B (Hughson Chemicals) may be employed. The adhesive is applied in a fluent state and is allowed to dry on all parts. Thereafter, in order to substantially eliminate resistance to lateral flow of the elastic rings 25 in radially outward direction under compression, a suitable lubricant layer 43 is applied to all of the bonding areas of the metal parts over the dried bonding adhesive. Thereafter all of the parts of the damper are assembled together with the clamping device. As the clamping device is tightened to place the assembly under compression, and in particular to place the elastic rings 25 under compression, the rings are held by the shoulders 29 and 34 of the clamping members 27 and 28, respectively, against spreading or flowing inwardly and therefore all spread or flow of the elastic members is controlled to be radially outwardly. By virtue of the lubricant 43 the force required to compress the elastic rings 25 is greatly reduced as compared to the force that would be required in the absence of the lubricant such that there would be frictional resistance to compression induced flow movement of the faces of the elastic rings 25 along the compressing surfaces of the metal parts of the damper. A suitable lubricant, where elastomer and adhesive are of the type identified, is dibutyl phthalate applied as a coating on the elastic ring engaged areas of the metal damper parts. Compression of the elastic rings 25 may be in the order of 10% of the thickness of the rings, and the radial length of the grooves 22 sufficient so that as the rings 25 elongate radially outwardly under compression they will in the final compressed assembled condition of the damper terminate at their radially outer diameters free from the opposing damper inertia weight housing surfaces 24.

After the damper parts have been assembled and clamped by the clamping device substantially as shown in FIG. 4, the joint between the radially outer flanges 20 is welded. For example, the assembled damper with the clamping device holding all of the parts of the damper in substantially accurately concentric assembled relation is mounted in a welding fixture 44 schematically shown in FIG. 4 as comprising identical clamping and heat sink or chill rings 45 which engage the working chamber defining portions of the damper inertia members 18 and 19 and attached as by means of screws 47 to rotary carriage members 48 which are axially separable to receive the damper and clamping device assembly and then are movable toward one another, as indicated by the directional arrows, to clamp the damper and support it for rotation in relation to welding means which may include a welding rod 49 which applies the weld 21 while the damper is supported in and rotated by the welding fixture 44. Cooling water is adapted to be delivered through ducts 50 to circulate in heat transfer chambers 51 within the chill rings 45. Thereby the welding heat is substantially prevented from reaching the elastic rings 25.

After welding has been completed, the damper assembly, still engaged in the clamping device, is placed in a suitable curing oven and heated to cure the bonding adhesive. For example, where the Chemlok 234-B adhesive is used, the cure time is about 15 minutes at 300° F. (150° C). After the curing of the adhesive has been completed, the elastic rings 25 are held against any tendency to escape from the radially inner sides of the grooves 22 under the compression to which they have been placed in the clamping device. To be sure that all joints and seams of the damper are hermetically tight, the damper, and with the clamping device still in place on it, if desired, is placed under internal air pressure test. For example, as shown in FIG. 5, the damper/clamp assembly may be immersed in a body of water 52 in a suitable tank 53 and air from any suitable source 54 under suitable pressure such as 100 psi (45 kg per cm$^2$) is introduced by way of a conduit 55 into the working chamber 14 through one of the filler openings 15 while the other of the filler openings 15 is closed by means of a removable plug 57. If leakage is detected at any point in the damper, the leak is repaired, if possible, and the damper retested for leakage. After passing the leakage test, the damper is filled with damping medium and then tested for performance, the clamping device having been removed in the meantime.

From the time the parts of the damper are assembled with the clamping device, the clamping device is adapted to remain on the damper assembly until the damper is ready for performance testing. By having the clamping member 27 provided with a central through bore 58, desirably conically counterbored as at 59 at each end to facilitate insertion of a handling tool such as a suspension rod, or the like, the clamping devices serves as a convenient carrier for production line handling of the damper assembly as it progresses through the various steps toward completion after being clamped in the device and up to the point of performance testing which requires that the damper be attached at its hub 12 by means of bolts through the bolt holes 39 to a test fixture.

It will be understood that variations and modifications may be effected without departing from the spirit and scope of the novel concepts of this invention.

I claim:

1. A method of making a tuned viscous torsional vibration damper assembly of the type having supporting disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, comprising:
   assembling said rings in said grooves;
   placing concentricity maintaining shoulder means across radially inner open sides of said grooves and in engagement with radially inner diameter of the rings whereby to assure concentricity of said rings within the grooves;
   effecting bonding of the rings to said opposing surface areas of said inertia mass and of said body;
   and after said bonding removing said concentricity maintaining shoulder means.

2. A method according to claim 1, wherein said elastic rings are preformed to a substantially greater thickness than the depth of said grooves and with an outside diameter substantially less than the outside diameter of said grooves, and placing the elastic rings under axial compression in said grooves whereby to reduce the compressed thickness of the rings and displace the rings radially outwardly at their radially outer diameters in said grooves.

3. A method according to claim 1, wherein said inertia mass comprises a pair of separately formed inertia members and said inertia rings are preformed, comprising assembling the inertia members and said rings and said disk means together with a clamping device having said concentricity maintaining shoulder means, holding the damper members, rings and disk means in proper concentric orientation in said device, in said device applying compression of said inertia members toward said elastic rings and said body whereby to place the elastic rings under compression.

4. A method according to claim 3, comprising applying bonding adhesive to the bonding areas of the inertia members, elastic rings and disk means, and while the assembly is engaged in the clamping device subjecting the damper to curing heat to complete bonding of the rings to said opposing surface areas of the inertia mass and of the disk means body.

5. A method according to claim 3, including securing said inertia members hermetically together while engaged by the clamping device.

6. A method according to claim 1, wherein said inertia mass comprises separately formed members and said elastic rings are preformed rings of substantially greater thickness than the depth of said grooves, applying bonding agent to said opposing surfaces of the inertia mass and of the body and of the rings before assembling them together, drying the bonding agent, applying a lubricant to said opposing surface areas of the inertia mass and of the body, assembling the elastic rings between said opposing surface areas, placing the elastic rings under compression between said opposing surfaces while retaining the radially inner sides of the rings by said shoulder means against radially inward displacement, during the compression of the rings effecting radially outward displacement of the rings aided by said lubricant, securing said inertia members fixedly together whereby to maintain the elastic rings under compression in the assembly, and curing said bonding agent to effect said bonding of the rings to said opposing surface areas.

7. A method according to claim 6, comprising after effecting said bonding and before removal of said shoulder means subjecting the damper to internal leakage detecting air pressure in a body of water, and after the pressure testing filling the working chamber with viscous damping medium.

8. Apparatus for making a tuned viscous torsional vibration damper assembly of the type having supporting disk means with a radially outwardly extending circular body and a radially inner hub portion adapted to be secured to a rotary member such as a crankshaft subject to vibrations to be damped by the damper, said body being received concentrically within a radially inwardly opening annular working chamber of an annular inertia mass, a viscous damping medium in said chamber between shear film spaced working surfaces of said body and said inertia mass, and said inertia mass having concentric annular grooves at opposite sides of and facing axially toward said body contiguous to the opening from said chamber, with elastic tuning spring, spacing and sealing rings coupling opposing surface areas of said inertia mass in said grooves and opposing surface areas on said body, comprising:

concentricity maintaining shoulder means constructed and arranged to extend across radially inner open sides of said grooves and in engagement with radially inner diameters of the rings whereby to assure concentricity of said rings assembled within the grooves and until bonding of the rings has been effected to said opposing surface areas of said inertia mass and of said body;

and means for releasably attaching said shoulder means to the damper assembly so that after said bonding has been effected, said shoulder means can be removed from said damper assembly.

9. Apparatus according to claim 8, including means for placing the elastic rings, which are preformed to a substantially greater thickness than the depth of said grooves and with an outside diameter substantially less than the outside diameter of said grooves, to axial compression in said grooves whereby to reduce the compressed thickness of the rings and displace the rings radially outwardly at their radially outer diameters in said grooves.

10. Apparatus according to claim 8, wherein said shoulder means comprise part of a clamping device, said clamping device including means for holding said rings and a pair of separately formed inertia members and said disk means together in concentric relation, and means for operating said device to apply compression of the inertia members toward the elastic rings and said body whereby to place the elastic rings under compression.

11. Apparatus according to claim 10, wherein said clamping device comprises a holder to facilitate effecting bonding of said rings.

12. Apparatus according to claim 10, including means for securing said inertia members hermetically together while engaged by the clamping device.

13. Apparatus according to claim 8, wherein said shoulder means comprise a combination clamping device and holder, and means for subjecting the damper to internal leakage detecting air pressure while the damper is engaged by the clamping device, said testing means including a body of water in which the damper carried by the damping device is immersed.

14. Apparatus according to claim 8, comprising a pair of clamping members having cylindrical pilot surfaces providing said shoulder means, clamping flanges on said clamping members for engagement with separately formed inertia members providing said inertia mass, and means for securing said clamping members against the inertia members and into compressing relation to said sealing rings between said inertia members and said body.

15. Apparatus according to claim 14, wherein said clamping device members include means telescopically engageable and including a cylindrical pilot surface for engaging a radially inner diameter on said hub portion to maintain the hub portion concentric with said rings and said inertia members.

* * * * *